(12) United States Patent
Nakamura

(10) Patent No.: US 8,274,554 B2
(45) Date of Patent: Sep. 25, 2012

(54) DISPLAY DEVICE

(75) Inventor: Kenji Nakamura, Chiryu (JP)

(73) Assignee: DENSO CORPORATION, Kariya (JP)

( * ) Notice: Subject to any disclaimer, the term of this patent is extended or adjusted under 35 U.S.C. 154(b) by 1624 days.

(21) Appl. No.: 11/640,940

(22) Filed: Dec. 19, 2006

(65) Prior Publication Data

US 2007/0171193 A1 Jul. 26, 2007

(30) Foreign Application Priority Data

Jan. 20, 2006 (JP) .................................. 2006-012696
Oct. 24, 2006 (JP) .................................. 2006-288855

(51) Int. Cl.
*H04N 13/04* (2006.01)

(52) U.S. Cl. ..................... 348/51; 348/46; 345/7; 345/9; 345/84; 345/173; 349/58; 349/65; 349/111; 349/146

(58) Field of Classification Search ..................... 348/42, 348/46, 51
See application file for complete search history.

(56) References Cited

U.S. PATENT DOCUMENTS

| | | | |
|---|---|---|---|
| 6,954,185 B2 | 10/2005 | Ogino | |
| 7,046,271 B2 * | 5/2006 | Doerfel et al. | 348/51 |
| 7,400,377 B2 * | 7/2008 | Evans et al. | 349/194 |
| 7,567,222 B2 * | 7/2009 | Tanaka et al. | 345/7 |
| 7,570,315 B2 * | 8/2009 | Tanaka et al. | 349/58 |
| 7,576,708 B2 * | 8/2009 | Tanaka | 345/7 |
| 7,671,935 B2 * | 3/2010 | Mather et al. | 349/65 |
| 7,940,357 B2 * | 5/2011 | Ahn et al. | 349/111 |
| 7,965,365 B2 * | 6/2011 | Uehara et al. | 349/146 |
| 7,995,076 B2 * | 8/2011 | Emam et al. | 345/633 |
| 2006/0098281 A1 | 5/2006 | Fukushima et al. | |
| 2006/0139234 A1 * | 6/2006 | Tanaka | 345/9 |
| 2007/0013624 A1 * | 1/2007 | Bourhill | 345/84 |
| 2008/0084361 A1 * | 4/2008 | Ueta et al. | 345/7 |
| 2009/0284474 A1 * | 11/2009 | Komaki et al. | 345/173 |
| 2010/0277657 A1 | 11/2010 | Fukushima et al. | |
| 2012/0026157 A1 * | 2/2012 | Unkel et al. | 345/419 |

FOREIGN PATENT DOCUMENTS

GB 2 405 546 A 3/2005

(Continued)

OTHER PUBLICATIONS

Office Action dated Jan. 9, 2009 in corresponding DE application No. 10 2007 001 142.5-55 (and English Translation).

(Continued)

*Primary Examiner* — Michael Won
(74) *Attorney, Agent, or Firm* — Posz Law Group, PLC

(57) ABSTRACT

A display device for a vehicle includes a display LCD and a control LCD, which has transmission switching portions, each of which has three segment units. When the vehicle is running, left-side two-third segment units of each transmission switching portion are set to a non-transparent state in a portion of the control LCD corresponding to the left half screen of the display LCD. In contrast, in a portion of the control LCD corresponding to the right half screen of the display LCD, all the segment units are set to a transparent state. Thus, an image in the right half screen is visible from a driver seat, while an image in the left half screen is not visible from the driver seat. Both the images in the right half screen and the left half screen are visible from a front passenger seat.

21 Claims, 13 Drawing Sheets

FOREIGN PATENT DOCUMENTS

| | | |
|---|---|---|
| GB | 2 415 849 A | 1/2006 |
| JP | A-9-269473 | 10/1997 |
| JP | A-2000-162981 | 6/2000 |
| JP | A-2004-233816 | 8/2004 |
| JP | A-2005-055611 | 3/2005 |
| JP | A-2005-084245 | 3/2005 |
| JP | A-2005-244574 | 9/2005 |
| JP | A-2005-321449 | 11/2005 |
| WO | WO 2004/016460 | 2/2004 |
| WO | WO 2005/071474 A2 | 8/2005 |

OTHER PUBLICATIONS

Office Action mailed Aug. 9, 2011 in corresponding JP application No. 2006-288855 (and English translation).

* cited by examiner

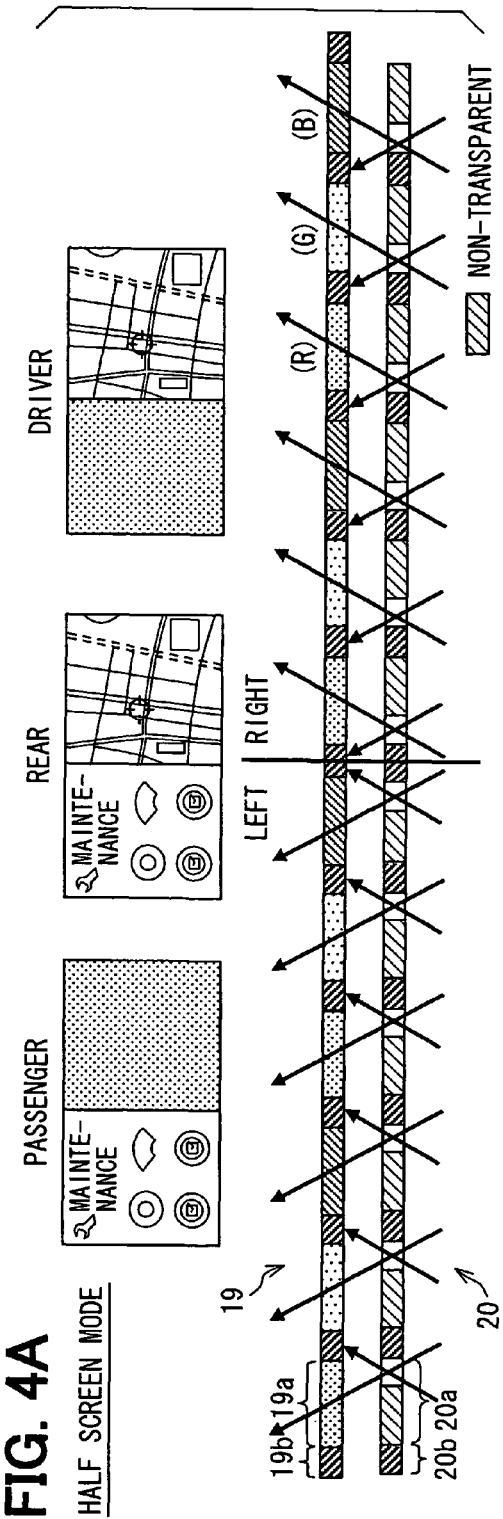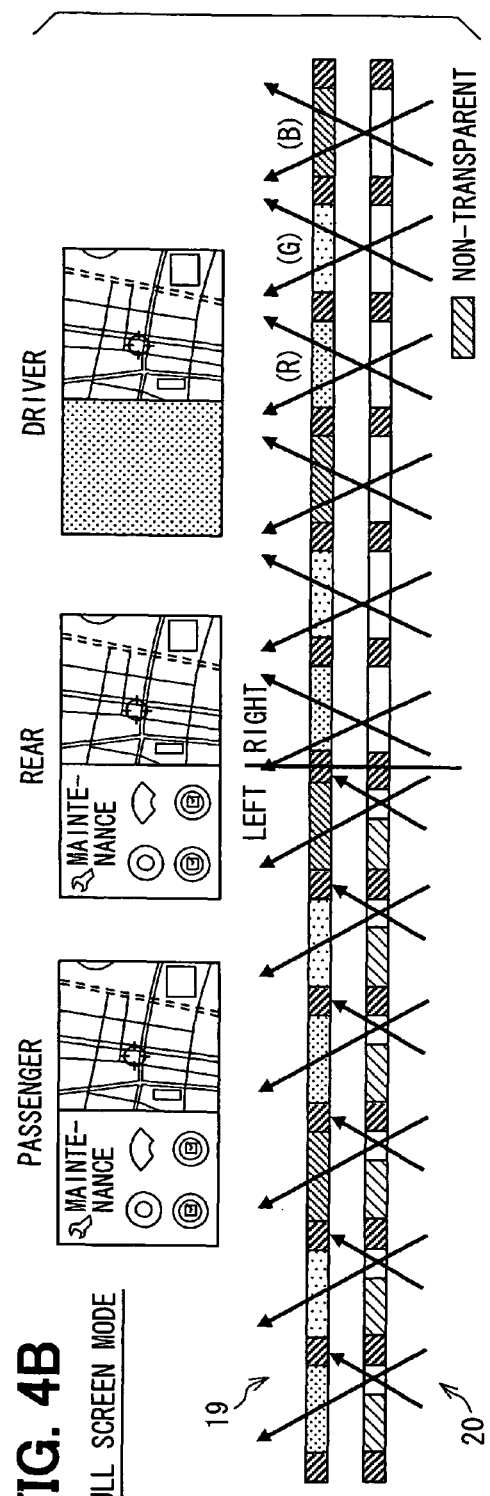

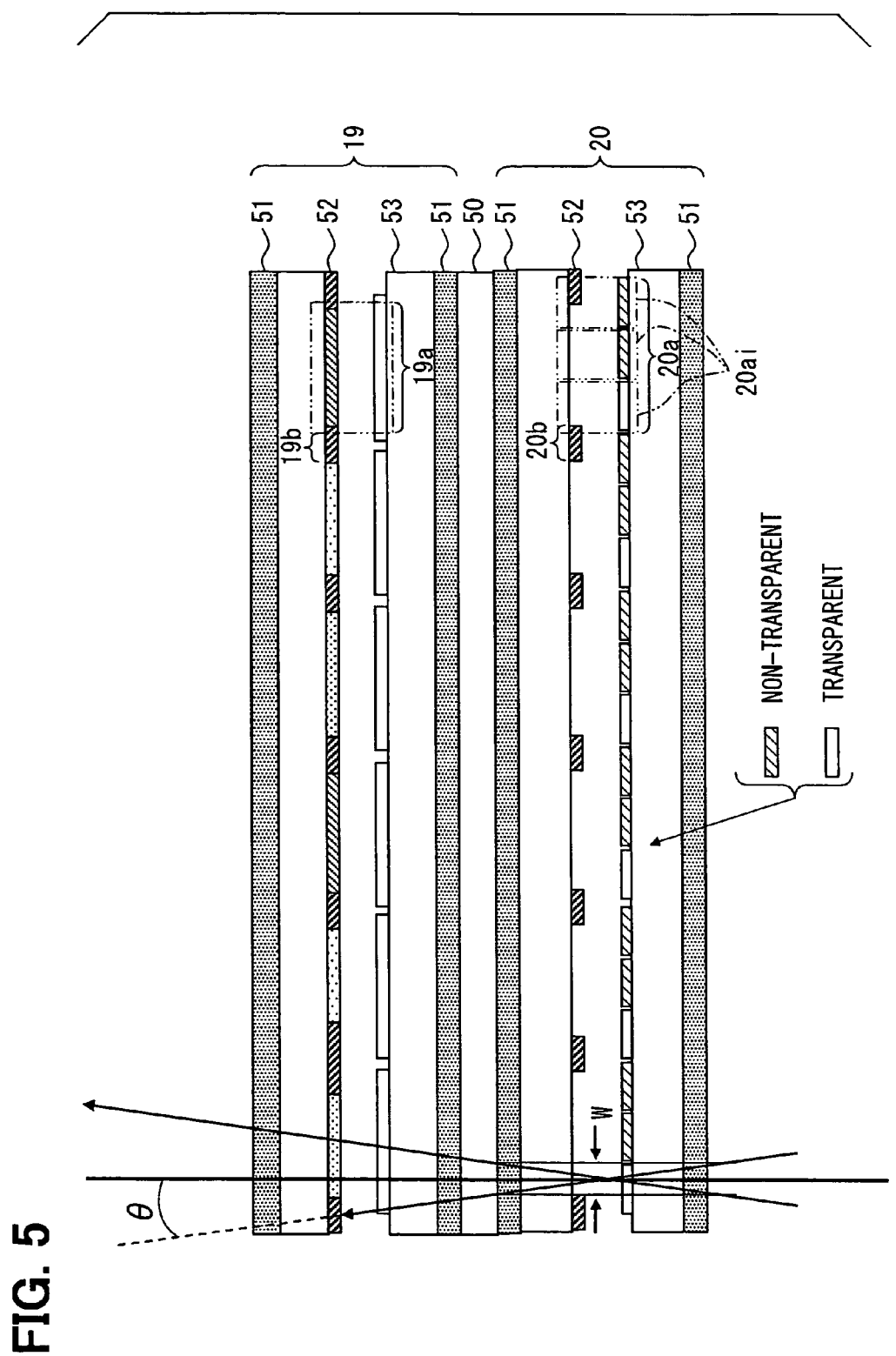

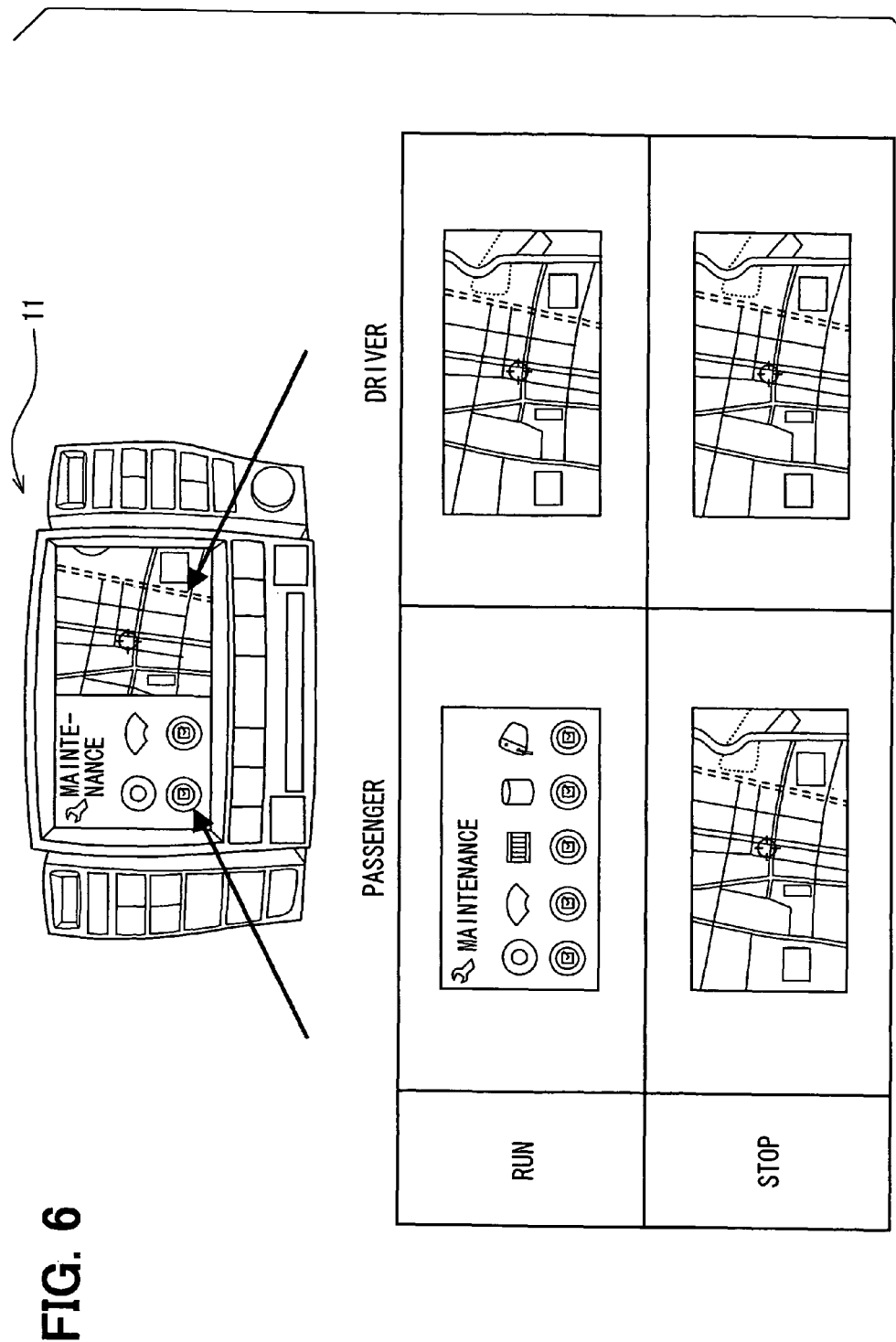

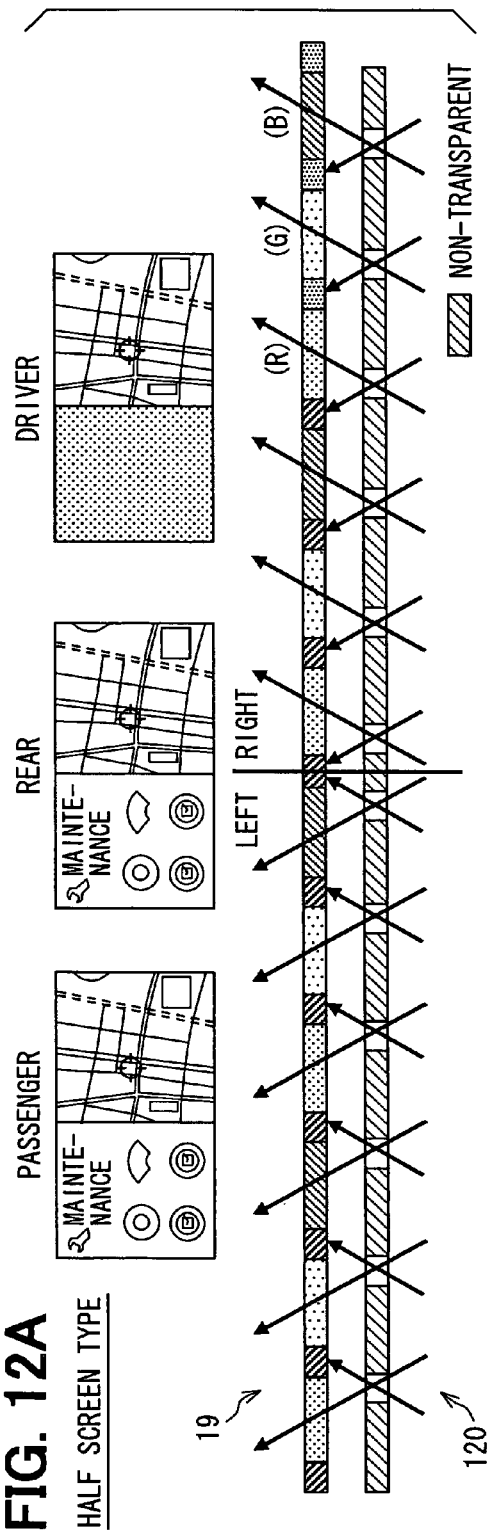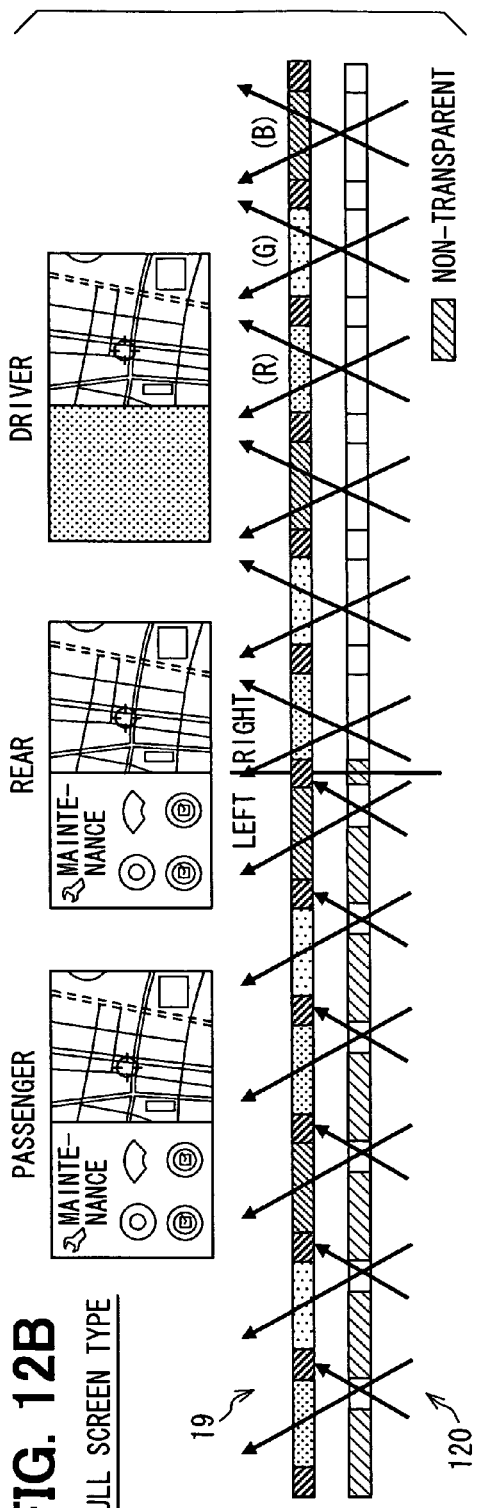

DISPLAY DEVICE

CROSS REFERENCE TO RELATED APPLICATION

This application is based on and incorporates herein by reference Japanese Patent Applications No. 2006-12696 filed on Jan. 20, 2006 and No. 2006-288855 filed on Oct. 24, 2006.

FIELD OF THE INVENTION

The present invention relates to a display device displaying an image, which is visible in a first viewing direction but invisible in a second viewing direction different from the first viewing direction.

BACKGROUND OF THE INVENTION

Patent document 1 proposes a display device displaying different images or contents, each of which is only visible in a specific viewing direction. For instance, an image visible from a right front position is different from an image visible from a left front position. In this display device, individual pixels are alternately used for either one of two windows visible from the right front position and the left front position, respectively; thus, two full-screen-sized windows appear in the screen on the display device. Only a half of all the pixels included in the display device is used for displaying one full-screen-sized window. This naturally degrades a fineness of an image in the window. Further, a view from a central front position is a mixture of images of the two windows.

To prevent degradation of fineness, it is proposed that the full screen region on a display device is divided into two segments, each of which displays only one of two windows. This is disclosed in Patent document 2. Patent document 2 further discloses a viewing angle control, in which a sight line in a specific viewing direction is only allowed to view an image on a window via a micro-prism or cylindrical lens provided to each pixel. Furthermore, another viewing angle control is disclosed which uses an orientation in liquid crystal molecules. The orientation of the molecules is controlled to tilt in a specific direction by applying voltage to a pair of electrodes, between which the molecules interpose.

Patent document 1: JP-2005-84245 A

Patent document 2: JP-2003-15535 A (U.S. Pat. No. 6,954,185)

Technologies disclosed in Patent document 2 involve the following:

(1) In the control using a micro-prism or cylindrical lens to each pixel, a large number of prisms or lenses are required for all the pixels, which complicates a structure of the display device. Each of the micro-prisms or cylindrical lenses needs to be fabricated to maintain a certain degree of accuracy to prevent degradation in fineness of images.

(2) In the control of the orientation of liquid molecules, characteristics of the orientation are significantly varied depending on alignment of substrates sandwiching molecules, which makes it difficult to control the orientation and viewing angle as well.

SUMMARY OF THE INVENTION

It is an object of the present invention to provide a display device displaying an image, which is visible in a first viewing direction but invisible in a second viewing direction different from the first viewing direction, to achieve a viewing angle control with a simple structure without degrading fineness in images.

According to an aspect of the present invention, a display device is provided as follows. A display unit is included for displaying an image. The display unit includes, with respect to a pixel, a display region and a light-shielding region. A parallactic barrier is included to be overlaid with the display unit for controlling a viewing angle. The parallactic barrier includes, with respect to a unit region corresponding to the pixel in the display unit, a transmission switching portion, which switches a transmission state of at least a portion of the unit region to one of a transparent state and a non-transparent state. A first display state and a second display state are allowed to be switched to each other based on a positional relationship between (i) the portion of the unit region switched to the transparent state of the parallactic barrier and (ii) the display region and the light-shielding region of the display unit. The first display state is a state in which a certain image in a certain portion of display regions in the display unit is visible in both a first viewing direction and a second viewing direction. The second display state is a state in which the certain image is visible in one of the first viewing direction and the second viewing direction.

According to another aspect of the present invention, a display device is provided as follows. A display unit is included for displaying an image. The display unit includes, with respect to a pixel, a display region and a light-shielding region. A parallactic barrier is included to be overlaid with the display unit for controlling a viewing angle. The parallactic barrier includes, with respect to a unit region corresponding to the pixel in the display unit, a transmission switching portion, which switches a transmission state of at least a portion of the unit region to one of a transparent state and a non-transparent state. A first display state and a second display state are allowed to be switched to each other based a positional relationship between (i) the portion of the unit region switched to the transparent state of the parallactic barrier and (ii) the display region and the light-shielding region of the display unit. The first display state is a state in which a certain image in a whole of the display regions in the display unit is visible in both a first viewing direction and a second viewing direction. The second display state is a state in which the certain image in the whole of the display regions is visible in one of the first viewing direction and the second viewing direction. A control unit is included for controlling the transmission switching portion (i) so that the first display state and the second display state are switched to each other when a state change is detected, and (ii) so that, in the second display state, a first sub-state and a second sub-state are switched to each other with a time divisional multiplex method, the first sub-state in which a first image in the whole of the display regions is visible in the first viewing direction, the second sub-state in which a second image in the whole of the display regions is visible in the second viewing direction. The control unit further controls the display unit so that the first image and the second image are alternately displayed in synchronization to switching the first sub-state and the second sub-state to each other with the time divisional multiplex method.

According to yet another aspect of the present invention, a display device is provided as follows. A display unit is included for displaying an image. The display unit includes, with respect to a pixel, a display region and a light-shielding region. A light-shielding layer is included for controlling a viewing angle. The light-shielding layer includes a light-shielding portion with respect to a unit region corresponding to the pixel in the display unit. An image in a certain portion of display regions in the display unit is visible in one of a first viewing direction and a second viewing direction based on a positional relationship between (i) the light-shielding portion of the light-shielding layer and (ii) the display region and the light-shielding region of the display unit.

BRIEF DESCRIPTION OF THE DRAWINGS

The above and other objects, features, and advantages of the present invention will become more apparent from the following detailed description made with reference to the accompanying drawings. In the drawings:

FIGS. 4A, 4B are diagrams for explaining a display control and a viewing angle control when a vehicle runs according to the first embodiment;

FIG. 5 is a diagram for explaining a display LCD and a control LCD according to the first embodiment;

FIG. 6 is a diagram for explaining a display control and a viewing angle control according to the second embodiment;

FIGS. 12A, 12B are diagrams for explaining a display control and a viewing angle control according to the third embodiment.

DETAILED DESCRIPTION OF THE PREFERRED EMBODIMENTS

First Embodiment

A display device 11 according to a first embodiment of the present invention will be explained with reference to FIGS. 1 to 5.

Structure of In-Vehicle System

Figure 1:
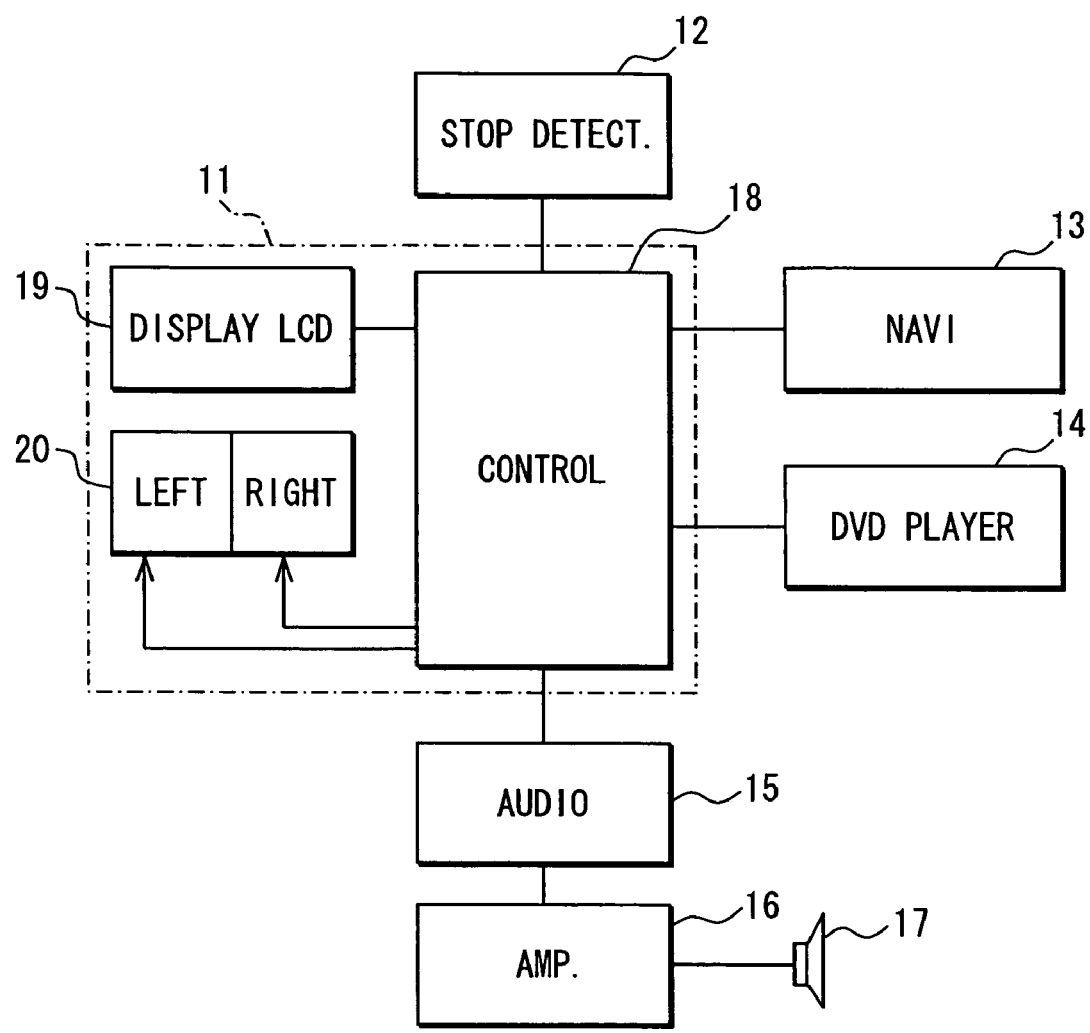
FIG. 1 is a block diagram illustrating an overall structure of an in-vehicle system including a display device according to a first and second embodiments.

With referring to FIG. 1, a display device 11 provided in a subject vehicle includes a stop state detector 12, imaging devices such as a navigation device 13 and a DVD player 14, an audio device 15, an amplifier 16, and a speaker 17. The display device 11 may further include another imaging device such as a TV tuner other than the navigation device 13 and DVD player 14.

The stop state detector 12 detects whether the vehicle is in a stop state, i.e., whether the vehicle stops or runs. This stop state detector 12 can be a speed sensor to detect a vehicle speed or a sensor to detect a state of an emergency brake.

The navigation device 13 includes a map database, a GPS receiver, and an autonomous navigation sensor, to detect a position of the vehicle and to output image signals and audio signals. The image signals include map images to show a position of the vehicle, a surrounding area, an enlarged intersection with a heading direction of the vehicle, or the like. The audio signals include an audio guidance.

The display device 11 includes a display controller (i.e., a control unit) 18, a liquid crystal display (LCD) 19 (i.e., a display LCD 19) functioning as a display unit (i.e., a screen) for a driver and a front passenger to see, and a liquid crystal display (LCD) 20 for a viewing angle control (i.e., a control LCD 20). In this embodiment, as an example, the subject vehicle is assumed to be a car with right-hand drive, e.g., used in Japan or England. The display LCD 19 is disposed such that an image on the display LCD 19 is seen from a driver seat and a front passenger seat (i.e., an assistant driver seat). With respect to a reference position, which perpendicularly faces the display LCD 19 and is defined to be located frontward of the display LCD 19, the driver seat is located on a right side, while the passenger seat is located on a left side. Further, a right half of the display LCD 19 (i.e., a right half screen) is defined to be closer to the driver seat than the passenger seat, while a left half of the display LCD 19 (i.e., a left half screen) is defined to be closer to the passenger seat than the driver seat. The control LCD 20 is disposed rearward of the display LCD 19, i.e., on, of the display LCD 19, a side facing a backlight (not shown). The backlight scatters lights. This means that lights are not radiated only in a specific direction towards the display LCD 19 and control LCD 20. Further, a different configuration may be optional; namely, the control LCD 20 may be disposed frontward of the display LCD 19. This order is from the control LCD 20 via the display LCD 19 to the backlight, with respect to the reference position.

FIG. 5 shows a cross-sectional view of the display LCD 19 and control LCD 20. Each of the display LCD 19 and control LCD 20 is laminated with the following order: a deflecting plate 51, an opposing substrate 52, a TFT substrate 53, and a deflecting plate 51. For instance, in an example shown in FIG. 5, a transparent material 50 for adjustment is interposed between the display LCD 19 and control LCD 20. This transparent material 50 is used to adjust an interval between the display LCD 19 and control LCD 20 to allow a viewing angle to be set to a preferable one.

The transparent material 50 can be removed for the LCDs 19, 20 to directly abut to each other. This may allow removal of one of two deflecting plates 51 in borders of both the LCDs 19, 20.

The opposing substrate 52 of the display LCD 19 includes a pixel of red (R), a pixel of green (G), a pixel of blue (B), and a black matrix 19b, which is interposed between the pixels of R, G, and B. The TFT substrate 53 is provided in units. Each unit opposes each pixel of the opposing substrate 52. A display region 19a is formed of both (i) each pixel of the opposing substrate 52 and (ii) a portion of the TFT substrate 53 faces the each pixel. The black matrix 19b corresponds to a light-shielding region.

Figure 3A:
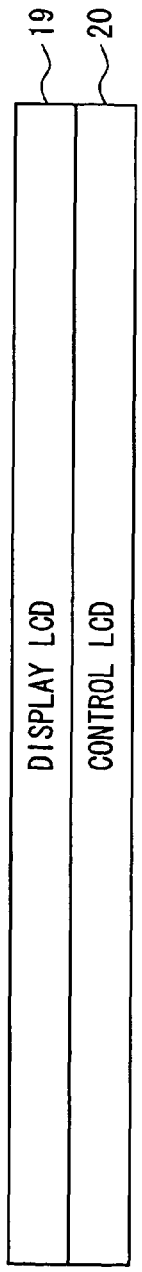
FIGS. 3A, 3B are diagrams for explaining a display control and a viewing angle control when a vehicle stops according to the first embodiment.
Figure 3B:
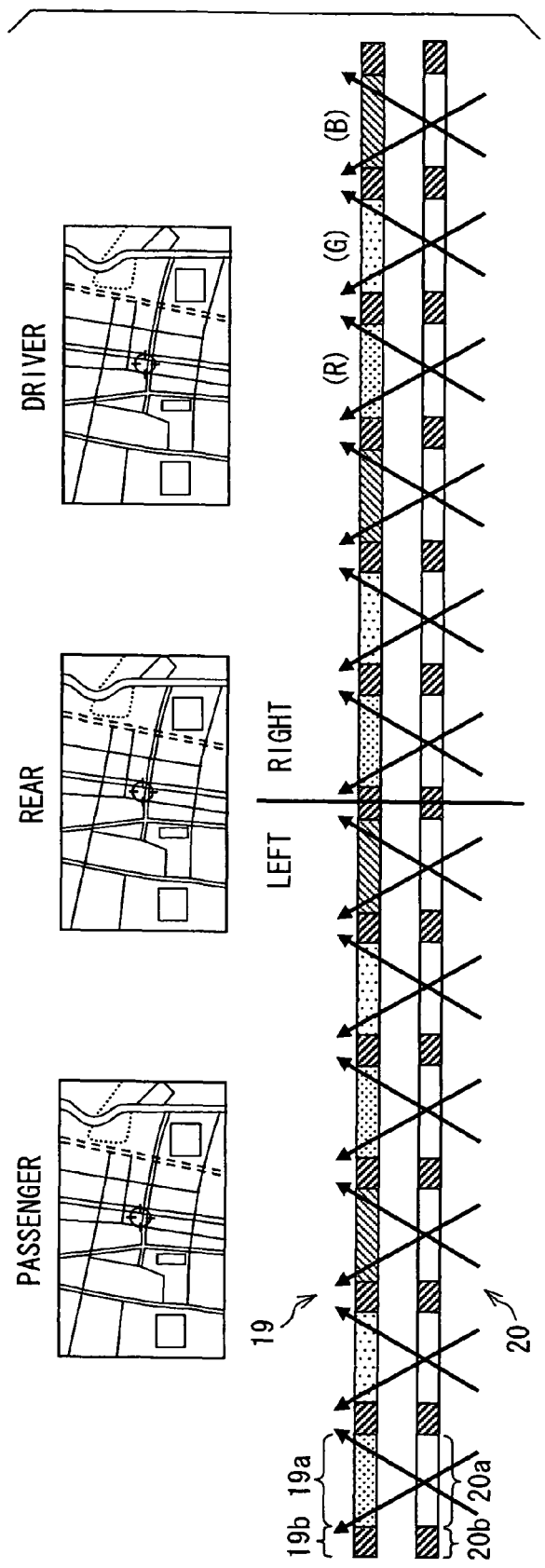

The control LCD 20 is divided into two segments of a first and second viewing angle control units, each of which controls a viewing angle for a half screen on a left side or right side relative to the center line, as shown in FIGS. 3B, 4A, and 4B.

As shown in FIG. 5, the opposing substrate 52 of the control LCD 20 includes (i) a transparent portion disposed to correspond to each pixel of the opposing substrate 52 of the display LCD 19, and (ii) a black matrix 20*b* disposed to correspond to each black matrix 19*b* of the opposing substrate 52 of the display LCD 19. The TFT substrate 53 of the control LCD 20 includes a regional unit, which corresponds to each transparent portion of the opposing substrate 52 of the control LCD 20 and is divided into three segments in the alignment direction of RGB (right-left direction in the screen) in the display LCD 19. Each regional unit can be controlled to be transparent or non-transparent. A transmission switching portion 20*a* for light-transmission is formed of both (i) one regional unit of the TFT substrate 53 and (ii) an opposing transparent portion of the opposing substrate 52. Further, a segment unit 20*ai* is defined to be formed of both (i) each segment of the three segments of one regional unit of the TFT substrate 53 and (ii) an opposing segment of the transparent portion of the opposing substrate 52. Thus, a transmission switching portion 20*a* is formed of three segment units 20*ai*.

Under the above structure, each transmission switching portion 20*a* of the control LCD 20 can control transmission or non-transmission of a corresponding region. For instance, a region occupying left-side two thirds in a right-left direction can be made non-transparent; a region occupying right-side two thirds can be made non-transparent. Thus, the control LCD 20 functions as a parallactic barrier. For instance, each segment unit 20*ai* may be independently provided with a voltage to switch a transparent state or non-transparent state to each other. Thus, a region corresponding to one pixel of the display LCD 19 can be entirely or partially made transparent or non-transparent.

As explained above, in this embodiment, a transmission switching portion 20*a* is divided into three segment units 20*ai* in the alignment of R, G, and B pixels. This is made from the following reason. Either right-side or left-side two thirds of the transmission switching portion 20*a* are made non-transparent with backlight turned on. In this case, an image can be visible from one of a driver seat and a front passenger seat and invisible from the other. In FIG. 5, if an eye point viewing the display LCD 19 is located in a direction having an angle of θ with respect to an orthogonal line to the screen of the display LCD 19, lights can pass through a transparent area W to reach the eye point. In other words, after a consideration of eye points in the driver seat or front passenger seat, it is determined that right-side or left-side two thirds of a transmission switching portion 20*a* should be switched to a non-transparent state.

After a consideration of eye points in the driver seat or front passenger seat, it may be determined that right-side or left-side three fifths of a transmission switching portion 20*a* should be switched to a non-transparent state. The number of segments of one transmission switching portion 20*a* and how to make a non-transparent portion can be varied as far as it is practically achievable.

The above eye points may be changed depending on kinds of vehicles. For instance, a positional relationship between a display device and a driver sear or front passenger seat may be changed depending on a structure of a vehicle. This changes eye points for viewing the display device. Thus, required eye points may be variable depending on a vehicle with the display device; therefore, the display device 11 may be provided with a setting function to responding to multiple eye points.

In this case, a transmission switching portion 20*a* may be divided into more than three segments, instead of the three segments, to change a ratio of non-transmission based on eye points. For instance, five segments may be adopted. Two fifths may be made non-transparent for a first vehicle, while three fifths for a second vehicle. Further, instead of changing the size of a region for transmission, the material of the region may be changed to adjust eye points.

Further, the display LCD 19 may be replaced by a cathode ray tube (CRT) or organic electroluminescence (EL) display panel. In this case, the control LCD 20 is disposed in front of the CRT or EL display panel.

As explained above, the display controller 18 separately controls the first viewing angle control unit for the left half screen and the second viewing angle control unit for the right half screen to thereby make an image reproduced by the DVD player 14 invisible from the driver seat while the subject vehicle is running. The display controller 18 includes a synthesizing portion, a switching portion, and a driving portion. The synthesizing portion receives image signals from the navigation device 13 and DVD player 14. This portion then transmits the image signal received from one of the navigation device 13 and DVD player 14 or an image signal synthesized from both the navigation device 13 and DVD player 14 to the display LCD 19, based on a setting by a user. Further, the synthesizing portion outputs control signals for switching or synthesizing image signals to the switching portion and the driving portion for driving a control of a viewing angle.

Figure 2:
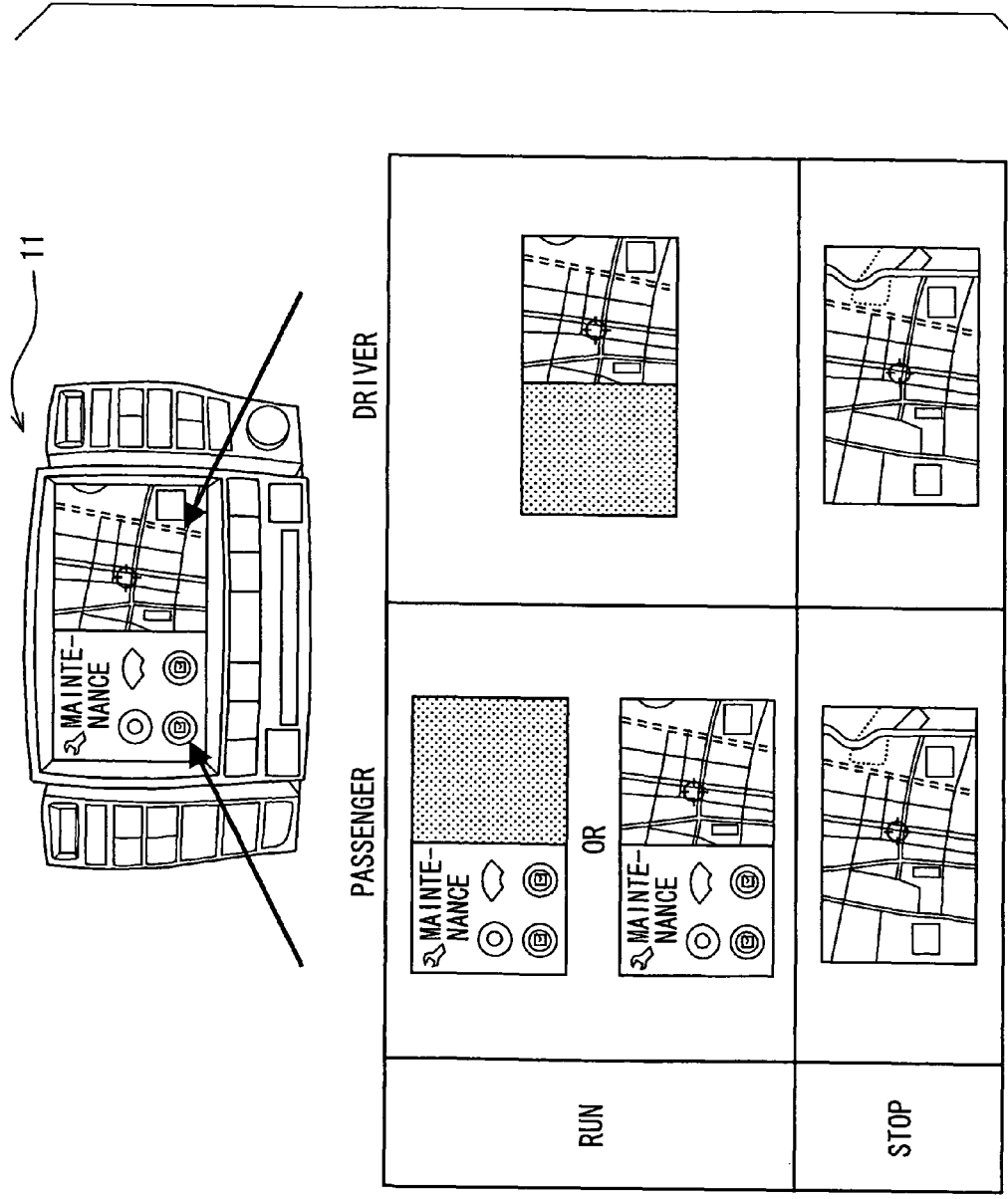
FIG. 2 is a diagram for explaining a display control and a viewing angle control according to the first embodiment.

With reference to FIG. 2, a display control and viewing angle control will be explained. When the subject vehicle stops, an identical window or an identical image on the window is visible from both the driver seat and front passenger seat. In this case, the window is shown in the full screen. In contrast, when the vehicle runs, two different windows are displayed in the right side (i.e., the right half screen) and left side (left half screen), respectively. In FIG. 2, while a vehicle runs, the right half screen shows a map window as an example of image data from the navigation device 13, while the left half screen shows a maintenance window as an example of image data from other than the navigation device 13, for easy understanding. Therefore, an example of image data from other than the navigation device 13 can be a window for a movie from the DVD player 14, which means the left half screen may show a window for a movie instead of the maintenance window.

The window on the left side of the screen is invisible from the driver seat, but visible from the front passenger seat. In this case, the window on the right side of the screen may be either invisible or visible from the front passenger seat. A full screen display mode for the front passenger seat is defined to indicate that both the windows on the right side and left side can be visible from the front passenger seat. A half screen display mode for the front passenger seat is defined to indicate that only the window on the left side can be visible from the front passenger seat.

The switching portion receives audio signals from the navigation device 13 and DVD player 14 and transmits the audio signal received from one or two of the audio signals from the navigation device 13 and DVD player 14 to the audio device 15 based on a control signal from the synthesizing portion. The driving portion outputs a first driving signal for driving the first viewing angle control unit and a second driving signal for driving the second viewing angle control unit, based on a control signal from the synthesizing portion and a signal from the stop state detector 12.

The audio device 15 switches, to each other, (i) an audio signal from the navigation device 13 or DVD player 14 provided via the display controller 18 and (ii) an audio signal from a CD player or radio turner contained in the audio device 15. An audio signal outputted from the audio device 15 is sent to the speaker 17 via the amplifier 16.

Operation of Display Device 11

The display controller 18 transmits to the display LCD 19 a signal from either the navigation device 13 or DVD player 14 or a signal synthesized from signals from the both the device 13 and player 14. When determining that the vehicle is in a stop state based on a signal from the stop state detector 12, the display controller 18 applies voltages to all the transmission switching portions 20a such that all the portions 20a move to a transparent state, as shown in FIG. 3B. In this state, the transmission switching portion 20a of the control LCD 20 always transmits lights. Thus, while the vehicle is in a stop state, any image such as a map image from the navigation device 13 or movie from the DVD player 14 can be visible from the front passenger seat and the driver seat as well.

This is illustrated in FIG. 3B. A map window or a map image in the map window is shown in the full screen. In other words, the left half of the map window is displayed in the left half screen, while the right half in the right half. Both the left half and the right half are visible as the entire map window from both the driver seat and passenger seat. Further, the same entire map window can be visible from a position in a rear seat (hereinafter referred to as a rear seat center), which is located in approximately just front of the screen of the display LCD 19. This position is similar to the above-defined reference position.

In contrast, when determining that the vehicle is running based on a signal from the stop state detector 12, the display controller 18 controls the control LCD 20 to cause an image from the DVD player 14 to be invisible from the driver seat. In this case, the right half screen displays a map image, while the left half screen displays an image from the DVD. In this case, either the full screen display mode or half screen display mode for the front passenger seat can be selectable.

FIG. 4A shows displayed images visible from the driver seat, rear seat center, and front passenger seat, in the half screen display mode for the front passenger seat. In this mode, all the transmission switching portions 20a are set to the non-transparent state in the two-thirds segment units 20ai. In the control LCD 20 corresponding to the right half screen, transmission switching portions 20a are set to the non-transparent state in the right-side two-thirds segment units 20ai. Thus, images (i.e., a map window) in the right half screen are visible from the driver seat, but images (i.e., a maintenance window) in the left half screen are invisible from the driver seat. In contrast, in the control LCD 20 corresponding to the left half screen, transmission switching portions 20a are set to the non-transparent state in the left-side two-thirds segment units 20ai. Thus, images (i.e., a maintenance window) in the left half screen are visible from the front passenger seat, but images (i.e., a map window) in the right half screen are invisible from the front passenger seat.

FIG. 4B shows displayed images visible from the driver seat, rear seat center, and front passenger seat, in the full screen display mode for the front passenger seat. In this mode, transmission switching portions 20a in the control LCD 20 corresponding to the left half screen are set to the non-transparent state in the left-side two-thirds segment units 20ai. In the control LCD 20 corresponding to the right half screen, transmission switching portions 20a are set to the transparent state in all the segment units 20ai. Thus, images (i.e., a map window) in the right half screen are visible from the driver seat, but images (i.e., a maintenance window) in the left half screen are invisible from the driver seat. In contrast, images (i.e., a map window) in the right half screen and images (i.e., a maintenance window) in the left half screen are visible from the front passenger seat.

Further, in the above cases shown in FIGS. 4A, 4B, the map window in the right half screen and the maintenance window in the left half screen are visible from the rear seat center.

The display device 11 in the first embodiment provides the following advantages.

(1) An image can be visible in a first viewing direction but invisible in a second viewing direction different from the first viewing direction. For instance, an image visible from the front passenger seat can be invisible from the driver seat. Further, an image visible from the driver seat and an image visible from the front passenger seat are visible from the rear seat center, which is located in approximately just front of the screen of the display LCD 19. In other words, an image visible from the front passenger seat and rear seat center can be invisible from the driver seat while the vehicle runs.

While a vehicle runs, a driver may be typically not recommended to see a movie or TV. Thus, a display device for an in-vehicle system is typically designed to make a movie or TV invisible while a vehicle runs. In contrast, although a passenger on a front passenger seat may not be prohibited from seeing a movie or the like, the passenger on the front passenger seat cannot see the movie or the like while the vehicle runs. The display device in this embodiment allows a passenger on a front passenger seat to see a movie while preventing a driver from seeing the movie while the vehicle runs.

(2) In the technology in Patent document 1, individual pixels are alternately used for the right side and left side; two full-sized windows, each of which has the same size as the full screen, are displayed. In this display method, pixels are alternatively used for one window, so that a fineness in each window is degraded compared with a window using all the pixels corresponding to the full screen. In contrast, the display device 11 in this embodiment divides the full screen into two right-side and left-side segments, each of which displays one window. As a result, a fineness in images in each one window is not degraded. Further, a view from the rear seat center is not a mixture of images in the two right-side and left-side windows, but clear images in the clearly divided two different windows.

(3) A transmission switching portion 20a can switch a transmission state with respect to a whole or a portion of a region corresponding to each pixel of the display LCD 19. A viewing angle is controlled based on a positional relationship between (i) the region set to the transparent state and the display region 19a or black matrix 19b of the display LCD 19. Thus, a viewing angle control can be achieved by a simple structure.

In Patent document 2, a viewing angle control is achieved by using micro-prisms or cylindrical lenses. The prism or lens is necessary for each pixel, so a great number of prisms or lenses are required. This needs a complicated structure. Each of the micro-prisms or cylindrical lenses needs to be fabricated to maintain a certain degree of accuracy to prevent degradation in fineness of images. A viewing angle control in this embodiment does not degrade fineness in images.

Further, in Patent document 2, a viewing angle control is achieved by controlling an orientation of liquid crystal molecules. Characteristics of the orientation are significantly varied depending on alignment of substrates sandwiching molecules, which makes it difficult to control the orientation and viewing angle as well. In this embodiment, a viewing angle control is achieved by controlling the transparent state and non-transparent state of the transmission switching portion 20a. This does not provide such a difficulty.

(4) A viewing angle control is achieved by controlling the transparent state and non-transparent state of the transmission switching portion 20a. This can provide a dynamic viewing angle control. For instance, when a viewing angle control is achieved by using a slit disclosed in Patent document 1, the left-side image is always invisible from the driver seat. The left-side image is allowed to be visible from the driver seat when the vehicle is in a stop state; however, the technology in Patent document 1 does not allow the left-side image to be visible from the driver seat. In contrast, this embodiment provides a dynamic control to allow a driver to see the left-side image or a map display in the full-screen, as needed. In other words, the left-side images can be optionally visible or invisible from the driver seat.

Second Embodiment

A display device 11 according to a second embodiment will be explained with reference to FIGS. 6, 7A, 7B, 8, and 9. A structure of the display device 11 and in-vehicle system including the device 11 is the same as that of the first embodiment. The same part as the first embodiment is omitted from explanation.

The second embodiment is different from the first embodiment in the display control. An outline of the display control will be explained with reference to FIG. 6. When the vehicle stops, an identical image or window can be visible from both the driver seat and front passenger seat. The window is displayed in the full-screen size. In contrast, when the vehicle runs, two different full-screen windows are displayed for the driver seat and front passenger seat; namely, a full-screen window (i.e., a map window) visible from the driver is different from a full-screen window (i.e., a maintenance window) visible from the front passenger seat.

Details of the display control will be explained with reference to FIGS. 7A, 7B, 8, and 9. When determining that the vehicle stops based on a signal from the stop state detector 12, the display controller 18 applies a voltage to the control LCD 20 to set all the transmission switching portions 20a to the transparent state (see FIG. 7B). In this state, the control LCD 20 always transmits lights. Thus, when the vehicle stops, a map image (or window) from the navigation device 13 or movie or the like from the DVD player 14 can be visible from both the driver seat and the front passenger seat.

Figure 7A:
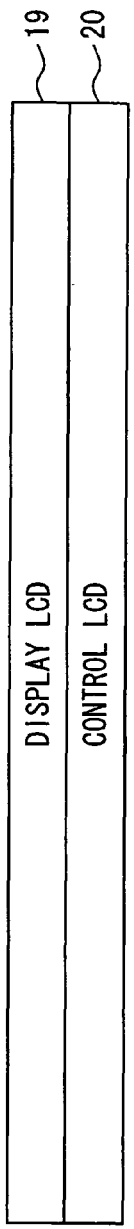
FIGS. 7A, 7B are diagrams for explaining a display control and a viewing angle control when a vehicle stops according to the second embodiment.
Figure 7B:
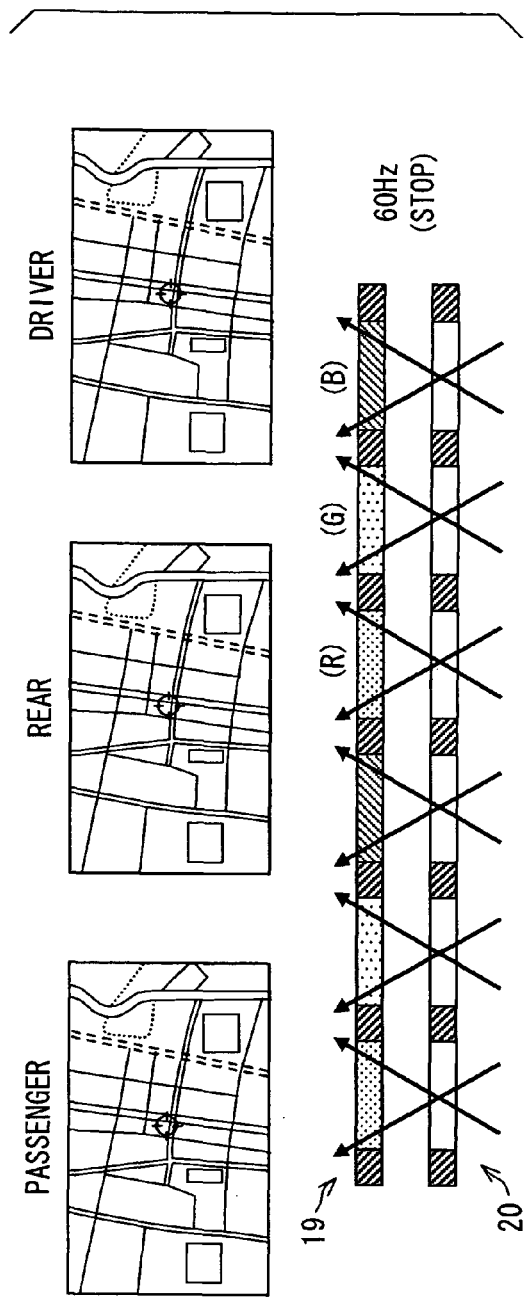

FIG. 7B shows that the identical map window can be visible from the driver seat and front passenger seat while the vehicle stops. As shown, the map window is displayed in the full-screen size. That is, the left half screen displays the left half of the map window and the right half screen displays the right half. Thus, the entire map window can be visible from both the seats. Further, the identical map window visible from the driver seat and the front passenger seat is visible from the rear seat center, which is located in approximately just front of the screen of the display LCD 19. In this state, the window is displayed using a frequency of 60 Hz, which allows a user to see the window without strangeness.

In contrast, when determining that the vehicle runs based on a signal from the stop state detector 12, the display controller 18 alternately displays an image or window from the navigation device 13 and an image or window from the DVD player 14, in the full screen using a time division multiplex method. In this state, the two windows are displayed using a frequency of 120 Hz, which allows two windows to alternately appear in the full screen. In this state, the control LCD 20 is controlled to follow the switching of the two windows. While an image or window from the DVD player 14 is displayed, all the transmission switching portions 20a are set to the non-transparent state in the left-side two-thirds of the three segment units 20ai. This prevents the window from being visible from the driver seat. While an image or window from the navigation device 13 is displayed, all the transmission switching portions 20a are set to the non-transparent state in the right-side two-thirds of the three segment units 20ai. This prevents the image from being visible from the front passenger seat.

Figure 9:
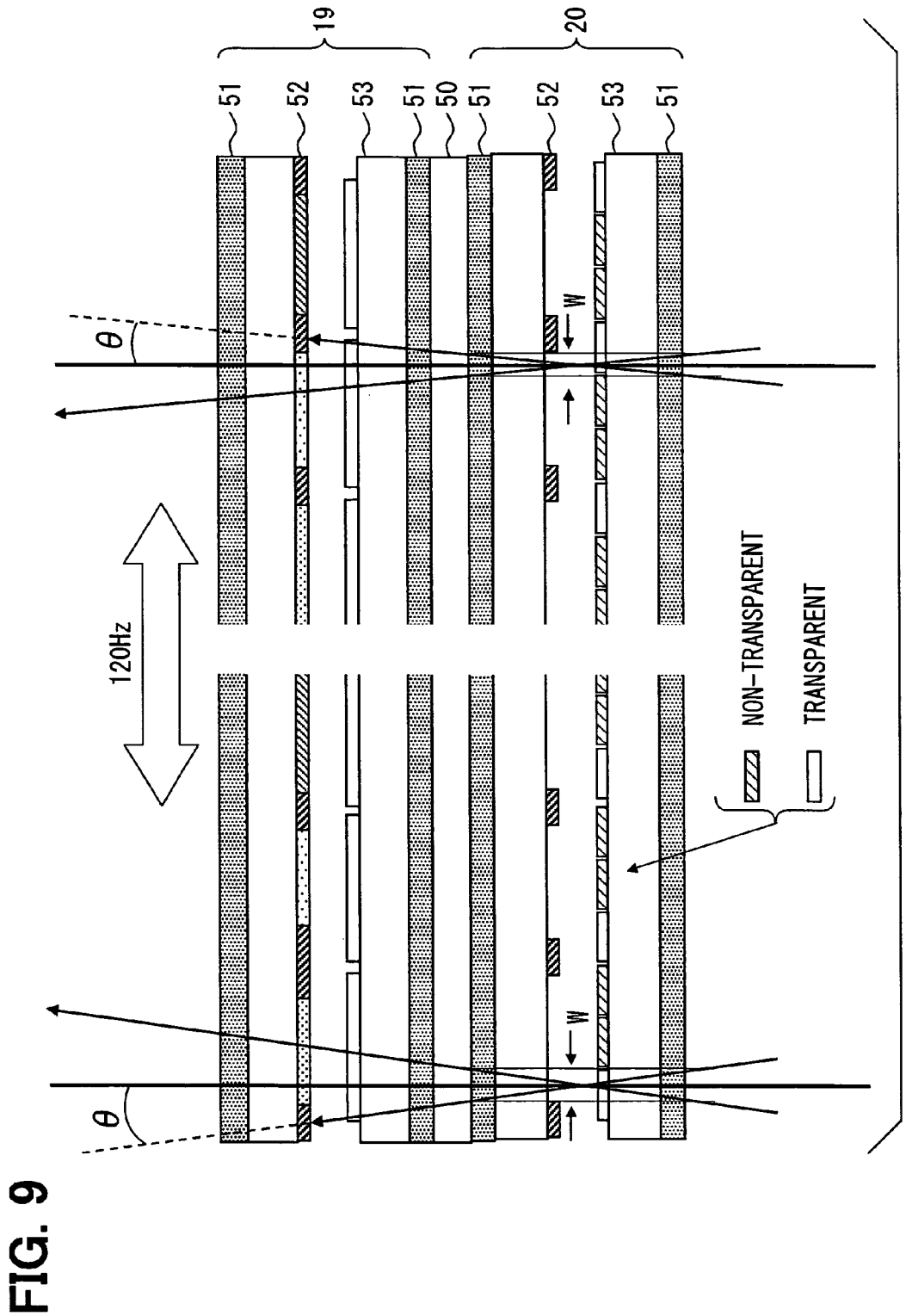
FIG. 9 is a diagram for explaining a display LCD and a control LCD according to the second embodiment.

FIG. 9 shows a switching control using the time division multiplex method. The display device 11 of the second embodiment provides an advantage below in addition to the advantages similar to those of the first embodiment.

The first embodiment decreases a screen size so as not to degrade a fineness of images. In contrast, the second embodiment achieves a full-screen display without degrading a fineness or decreasing a screen size.

Figure 8:
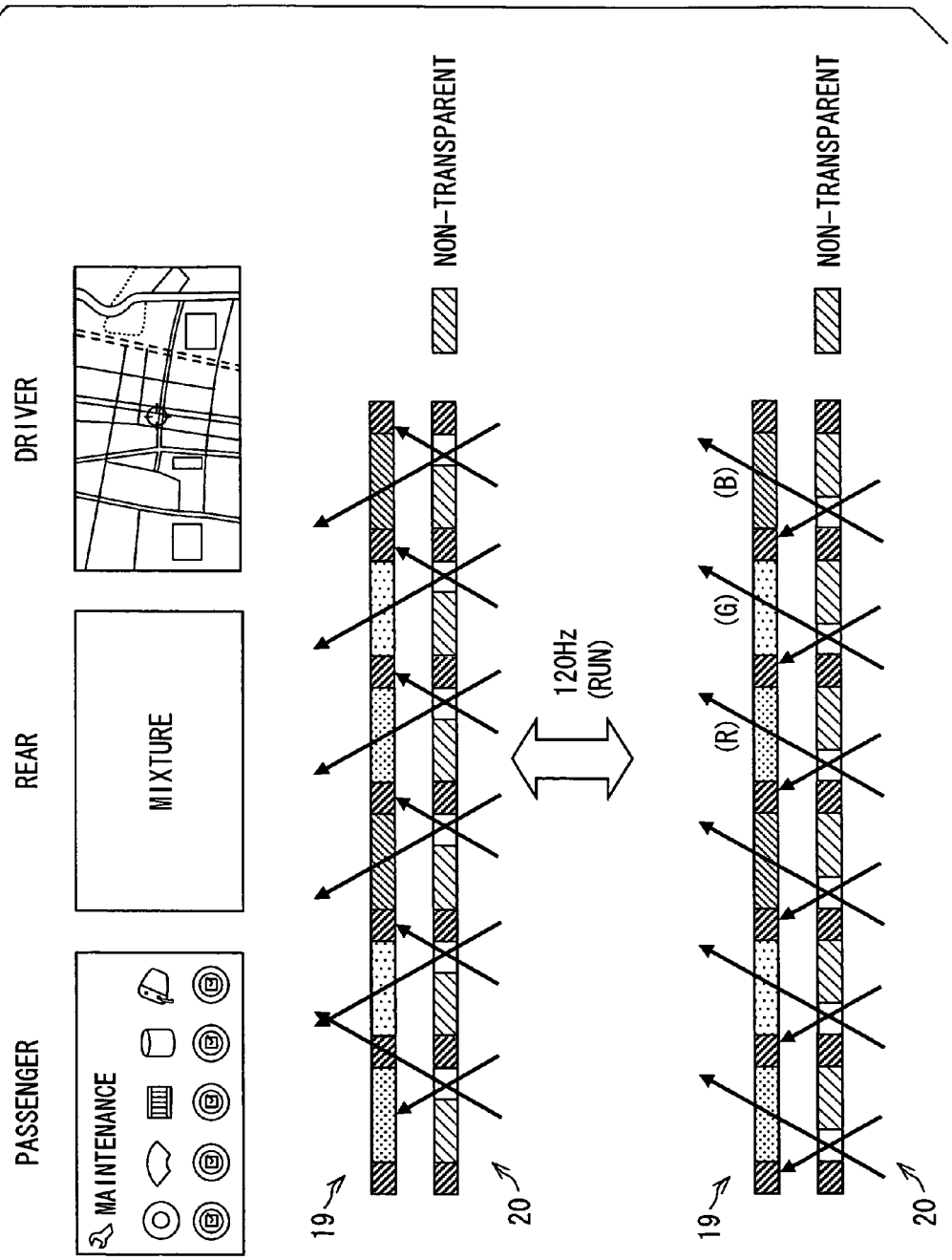
FIG. 8 is a diagram for explaining a display control and a viewing angle control when a vehicle runs according to the second embodiment.

One feature of the first embodiment is not achieved by the second embodiment. In the time divisional multiplex method, a view seen from the rear seat center is a mixture of both the windows, as shown in FIG. 8. Although having such a disadvantage, the second embodiment can provide advantages to relatively increase a screen size without degrading a fineness of images.

Third Embodiment

Structure of In-Vehicle System

Figure 10:
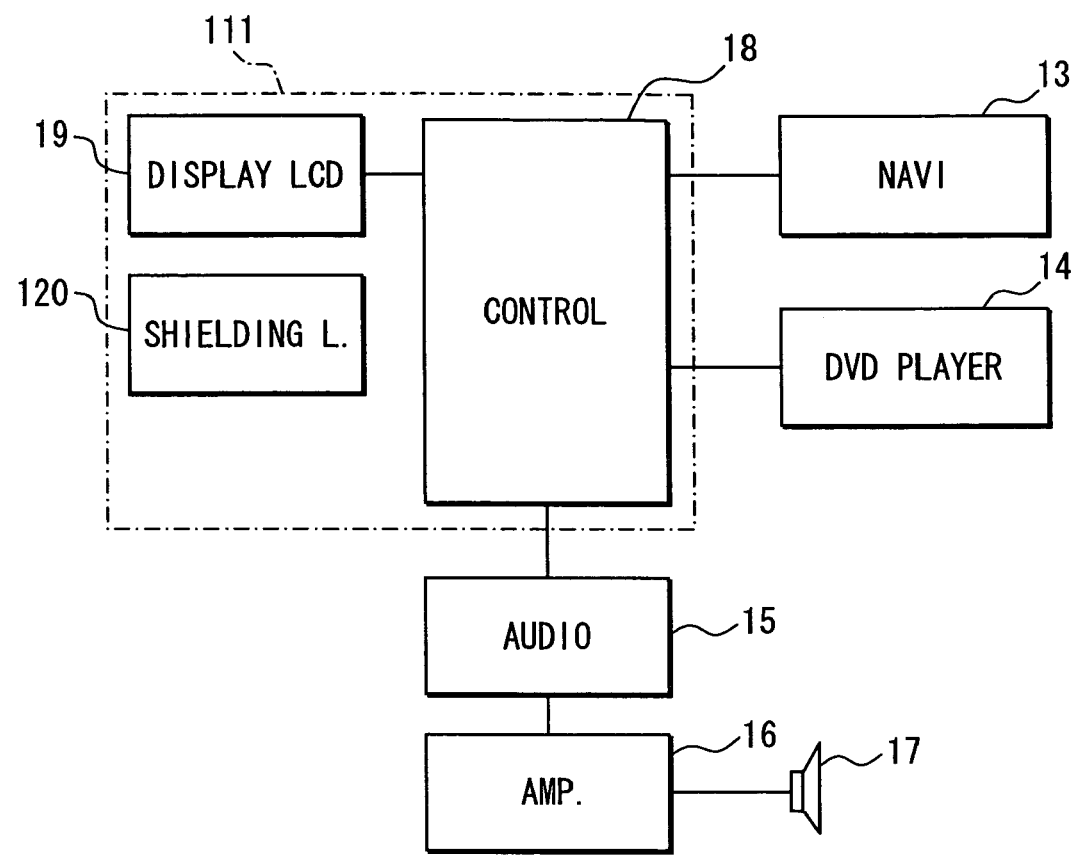
FIG. 10 is a block diagram illustrating an overall structure of an in-vehicle system including a display device according to a third embodiment.

With referring to FIG. 10, a display device 111 provided in a subject vehicle includes imaging devices such as a navigation device 13 and a DVD player 14, an audio device 15, an amplifier 16, and a speaker 17. The display device 11 may further include another imaging device such as a TV tuner other than the navigation device 13 and DVD player 14.

The navigation device 13 includes a map database, a GPS receiver, and an autonomous navigation sensor, to detect a position of the vehicle and to output image signals and audio signals. The image signals include map images to show a position of the vehicle, a surrounding area, an enlarged intersection with a heading direction of the vehicle, or the like. The audio signals include an audio guidance.

The display device 11 includes a display controller 18, a liquid crystal display (LCD) 19 for display (i.e., a display LCD 19), and a light-shielding layer 120 to control a viewing angle. The light-shielding layer 120 is disposed rearward of the display LCD 19, namely in, of the display LCD 19, a side facing a backlight (not shown).

Figure 13:
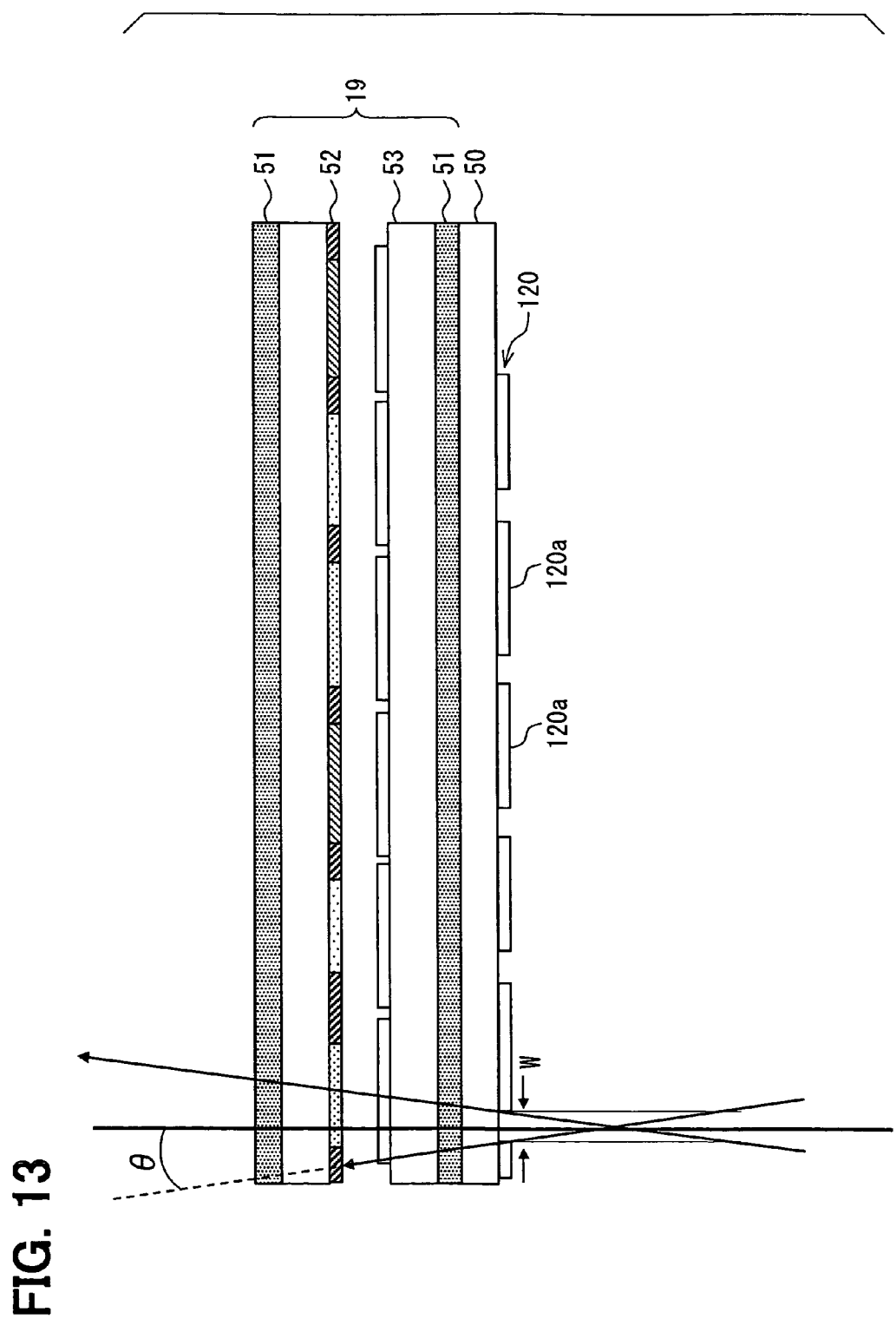
FIG. 13 is a diagram for explaining a display LCD and a light-shielding layer according to the third embodiment.

FIG. 13 shows a cross-sectional view of the display LCD 19 and a light-shielding layer 120 for controlling a viewing angle. The display LCD 19 is laminated with the following order: a deflecting plate 51, an opposing substrate 52, a TFT substrate 53, and a deflecting plate 51. Although not shown in FIGS. 12A, 12B, and 13, the display region 19a and black matrix 19b in the first embodiment are also included in the second embodiment.

The light-shielding layer 120 can be a light-shielding film used as a black matrix (BM). For instance, in an example shown in FIG. 13, a transparent material 50 for adjustment is interposed between the display LCD 19 and light-shielding layer 120. This transparent material 50 is used to adjust an interval between the display LCD 19 and light-shielding layer 120 to allow a viewing angle to be set to a preferable one.

Figure 11A:
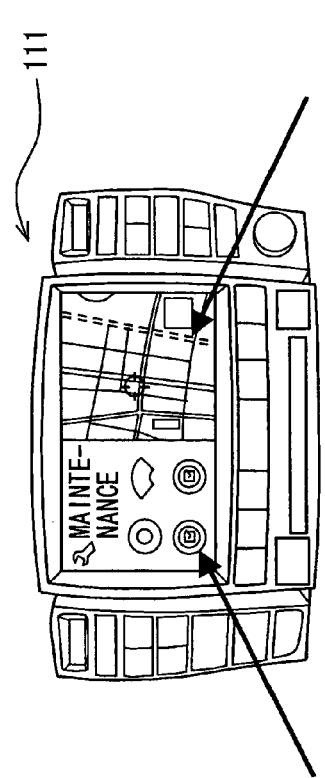
FIGS. 11A, 11B are diagrams for explaining a display control and a viewing angle control according to the third embodiment.
Figure 11B:
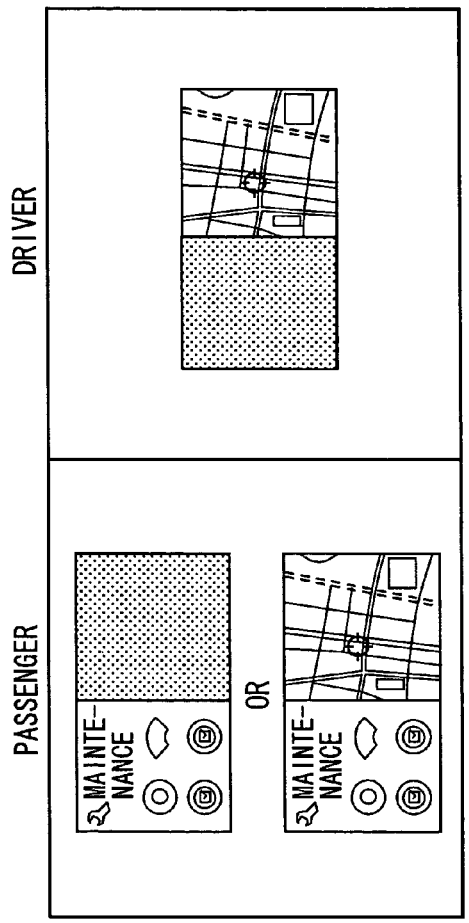

A region shielded by the light-shielding layer 120 is provided with respect to each pixel of red (R), green (G), or blue (B). Arrangement of the light-shielding layer 120 varies depending on a display state to be required. An outline of the display state will be explained with reference to FIGS. 11A, 11B. Different images or windows are displayed in the right half screen and the left half screen. Only the right-side image is visible from the driver seat, while the left-side image is invisible from the driver seat. In contrast, a view seen from the front passenger seat can be varied depending on either a half screen display type or full screen display type for the front passenger seat. In the half screen display type, only the left-side image is visible from the front passenger seat and the right-side image is invisible from the front passenger seat. In the full screen display type, both the right-side and left-side images are visible from the front passenger seat.

In the half screen display type, the light-shielding layer 120 is provided to correspond to the full screen, as shown in FIG. 12A. Here, a shielded region in the right half screen is different from that in the left half screen. For instance, in the left half screen, left-side two thirds of a region corresponding to a pixel are shielded from lights. In contrast, in the right half screen, right-side two thirds of a region corresponding to a pixel are shielded from lights. Here, right-left direction in the screen is the direction of the alignment of RGB.

Either right-side or left-side two thirds of a region corresponding to each pixel are made non-transparent with backlight turned on. In this case, an image can be visible from one of the driver seat and the front passenger seat, but invisible from the other. In other words, a consideration of eye points in the driver seat and front passenger seat results in making right-side or left-side two thirds of the region corresponding to each pixel. In other words, after a consideration of eye points in the driver seat or front passenger seat, it is determined that right-side or left-side two thirds of the region corresponding to each pixel should be shielded from lights. Otherwise, a consideration of eye points in both the seats may result in necessity of making right-side or left-side three fifths of the region shielded from lights. To achieve such a light-shielded structure, the light-shielding layer 120 may be re-designed. The light-shielding layer 120 may function as a parallactic barrier. This layer may be formed of multiple light-shielding portions 120a, each of which may function as a transmission switching portion. This light-shielding portion 120a may be attached to the transparent material 50 to constantly shield, from lights, a portion of a unit region corresponding to a pixel in the display LCD 19.

The display controller 18 includes a synthesizing portion, a switching portion, and a driving portion. The synthesizing portion receives image signals from the navigation device 13 or DVD player 14 and transmits to the display LCD 19 the received image signals or synthesized image signals according to a setting by a user. The synthesizing portion outputs control signals for switching or synthesizing image signals to the switching portion and the driving portion for driving a control of a viewing angle.

The switching portion receives audio signals from the navigation device 13 or DVD player 14 and transmits the received signals to the audio device 15 based on the control signal from the synthesizing portion. The driving portion outputs a first driving signal for driving the first viewing angle control unit and a second driving signal for driving the second viewing angle control unit, based on the control signal from the synthesizing portion and a signal from the stop state detector 12.

The audio device 15 switches (i) an audio signal from the navigation device 13 or DVD player 14 via the display controller 18 and (ii) an audio signal from a CD player or radio turner contained in the audio device 15. An audio signal output from the audio device 15 is sent to the speaker 17 via the amplifier 16.

Operation of Display Device 111

The display controller 18 transmits to the display LCD 19 a signal from either the navigation device 13 or DVD player 14 or a signal synthesized from signals from the both the device 13 and player 14.

When using the light-shielding layer 120 for the half screen display type for the front passenger seat, images in the right half screen are visible from the driver seat, but images in the left half screen are invisible from the driver seat, as shown in FIG. 12A. In contrast, the images in the left half screen are visible from the front passenger seat and the images in the right half screen are invisible from the front passenger seat. Further, both the images in the right half screen and left half screen on the display device 111 are visible from the rear seat center.

When using the light-shielding layer 120 for the full screen display type for the front passenger seat, images in the right half screen are visible from the driver seat, but images in the left half screen are invisible from the driver seat, as shown FIG. 12B. In contrast, the images in both the right half screen and left half screen are visible from the front passenger seat. Further, both the images in the right half screen and left half screen on the display device 111 are visible from the rear seat center.

The display device 111 in the third embodiment provides the following advantages.

(1) An image can be visible in a first viewing direction but invisible in a second viewing direction different from the first viewing direction. For instance, an image visible from the front passenger seat can be invisible from the driver seat.

(2) In the technology in Patent document 1, individual pixels are alternately used for the right side and left side; two full-sized windows, each of which has the same size as the full screen, are displayed. In this display method, pixels are alternatively used for one window, so that a fineness in each window is degraded compared with a window using all the pixels corresponding to the full screen. In contrast, the display device 111 in this embodiment divides the full screen into two right-side and left-side segments, each of which displays one window. As a result, a fineness in images in each one window is not degraded. Further, a view from the rear seat center is not a mixture of images in the two right-side and left-side windows, but clear images in the clearly divided two different windows.

(3) A viewing angle control is achieved by the light-shielding layer 120, which has a simple structure. In Patent document 2, a viewing angle control is achieved by using micro-prisms or cylindrical lenses. The prism or lens is necessary for each pixel, so a great number of prisms or lenses are required. This needs a complicated structure. Each of the micro-prisms or cylindrical lenses needs to be fabricated to maintain a certain degree of accuracy to prevent degradation in fineness of images. A viewing angle control in this embodiment does not involve such a problem.

Further, in Patent document 2, a viewing angle control is achieved by controlling an orientation of liquid crystal molecules. Characteristics of the orientation are significantly varied depending on alignment of substrates sandwiching molecules, which makes it difficult to control the orientation and viewing angle as well. In this embodiment, a viewing angle control is achieved by the light-shielding layer 120. This does not provide such a difficulty.

(Others)

(a) In the first and second embodiments, the control LCD 20 is used as a parallactic barrier. However, a parallactic barrier can be achieved by a mechanical shutter using a micro electro mechanical system (MEMS).

(b) In the above embodiments, an in-vehicle system is used as an example; however, the present invention can be adapted to another system other than the in-vehicle system. For instance, a display device 11, 111 can be applied to a monitor used in a business setting where a salesperson is talking business with a customer. A viewing angle control may be useful when the salesperson would like to see data, which should not be disclosed to the customer.

A viewing angle control may be applied to a display unit of a cell phone. Further, it can be applied to a display unit for a game. In this case, a full screen mode is typically used without a viewing angle control. When a match-up game is played among several persons, a viewing angle control is used to prevent an image, which one person sees, from being viewed from another person.

(c) In the above embodiments, a screen is divided in a right-left direction (i.e., horizontal direction); however, it can be divided in an up-down direction (vertical direction). Further, a screen may be divided into segments, which do not have an equal size. Further, the number of segments can be more than two without limiting it to two.

It will be obvious to those skilled in the art that various changes may be made in the above-described embodiments of the present invention. However, the scope of the present invention should be determined by the following claims.

What is claimed is:

1. A display device, comprising:
a display unit having a screen for displaying an image, the screen of the display unit including, with respect to each of a plurality of pixels, a display region and a light-shielding region; and
a parallactic barrier overlaid with the display unit for controlling a viewing angle of the screen, the parallactic barrier including, with respect to each of a plurality of unit regions corresponding to one of the plurality of pixels in the display unit, a transmission switching portion, which switches a transmission state of at least a portion of the unit region to one of a transparent state and a non-transparent state, wherein:
the display unit displays a first image in a first partial area of the screen and a second image in a second partial area of the screen,
the second image being different from the first image,
the second partial area of the screen being separated from the first partial area of the screen; and
a first display state and a second display state are allowed to be switched with each other, based on positional relationships between (i) the portion of each unit region of the parallactic barrier switched to the transparent state and (ii) each corresponding display region and each light-shielding region of the display unit,
the first display state being characterized by the first image in the first partial area of the screen being visible in both a first viewing direction and a second viewing direction and the second image in the second partial area of the screen being visible only in the second viewing direction,
the second display state being characterized by the first image in the first partial area of the screen being visible only in the first viewing direction and the second image in the second partial area of the screen being visible only in the second viewing direction.

2. The display device of claim 1, further comprising:
a control unit that controls the transmission switching portion so as to switch the first display state and the second display state with each other when a state change is detected.

3. The display device of claim 2, wherein:
the display device is for a vehicle;
whether the vehicle stops or runs is detected by a stop state detector; and the control unit controls the transmission switching portion
so that the first display state appears when it is detected that the vehicle stops, and
so that the second display state appears when it is detected that the vehicle runs.

4. The display device of claim 1, wherein
the transmission switching portion includes a plurality of segment units, and
the transmission state of the portion of the unit region is switched with respect to each segment unit.

5. The display device of claim 1, wherein
the parallactic barrier includes a liquid crystal display.

6. The display device of claim 1, wherein
the parallactic barrier includes a mechanical shutter.

7. The display device of claim 1, wherein
the first viewing direction and the second viewing direction are included in a plurality of directions.

8. The display device of claim 1, wherein
the display device is for a vehicle, and
the first viewing direction is a direction in which a driver seat of the vehicle views the display unit, while the second viewing direction is a direction in which a front passenger seat of the vehicle views the display unit.

9. The display device of claim 8, wherein:
the first partial area of the screen and the second partial area of the screen are arranged in the screen to be adjacent along a vehicle-width direction; and
the first partial area of the screen is arranged on a side of the driver seat whereas the second partial area of the screen is arranged on a side of the front passenger seat.

10. The display device of claim 1, wherein:
a third viewing direction is disposed between the first viewing direction and the second viewing direction;
in the first display state,
the first image in the first partial area of the screen is visible in three directions of the first viewing direction, the second viewing direction, and the third viewing direction, and
the second image in the second partial area of the screen is visible in two directions of the second viewing direction and the third viewing direction; and
in the second display state,
the first image in the first partial area of the screen is visible in two directions of the first viewing direction and the third viewing direction, and
the second image in the second partial area of the screen is visible in two directions of the second viewing direction and the third viewing direction.

11. The display device of claim 10, wherein
the display device is for a vehicle,
the first viewing direction is a direction in which a driver seat of the vehicle views the display unit,
the second viewing direction is a direction in which a front passenger seat of the vehicle views the display unit, and
the third viewing direction is a direction in which a rear seat of the vehicle views the display unit.

12. A display device, comprising:
a display unit for displaying an image, the display unit including, with respect to a pixel, a display region and a light-shielding region; and
a parallactic barrier overlaid with the display unit for controlling a viewing angle, the parallactic barrier including, with respect to a unit region corresponding to the pixel in the display unit, a transmission switching portion, which switches a transmission state of at least a portion of the unit region to one of a transparent state and a non-transparent state, wherein a first display state and a second display state are allowed to be switched with each other based on a positional relationship between (i) the portion of the unit region switched to the transparent state of the parallactic barrier and (ii) the display region and the light-shielding region of the display unit, the first display state is characterized by a certain image in a certain portion of display regions in the display unit being visible in both a first viewing direction and a second viewing direction, the second display state being characterized by the certain image in the certain portion of the display regions being visible in one of the first viewing direction and the second viewing direction, wherein:

the certain portion of the display regions in the display unit is extended to a whole of the display regions, the first display state is a state in which a certain image in the whole of the display regions is visible in both the first viewing direction and the second viewing direction, and the second display state is a state in which the certain image in the whole of the display regions is visible in one of the first viewing direction and the second viewing direction, the display device further comprising:

a control unit for controlling the transmission switching portion
(i) so that the first display state and the second display state are switched with each other when a state change is detected, and
(ii) so that, in the second display state, a first sub-state and a second sub-state are switched with each other with a time divisional multiplex method, the first sub-state in which a first image in the whole of the display unit is visible in the first viewing direction, the second sub-state in which a second image is visible in the second viewing direction, and for controlling the display unit
so that the first image and the second image are alternately displayed in synchronization to switching the first sub-state and the second sub-state with each other using the time divisional multiplex method.

13. A display device, comprising:

a display unit for displaying an image, the display unit including, with respect to a pixel, a display region and a light-shielding region;

a parallactic barrier overlaid with the display unit for controlling a viewing angle, the parallactic barrier including, with respect to a unit region corresponding to the pixel in the display unit, a transmission switching portion, which switches a transmission state of at least a portion of the unit region to one of a transparent state and a non-transparent state, wherein a first display state and a second display state are allowed to be switched with each other based on a positional relationship between (i) the portion of the unit region switched to the transparent state of the parallactic barrier and (ii) the display region and the light-shielding region of the display unit, the first display state in which a certain image in a whole of display regions in the display unit is visible in both a first viewing direction and a second viewing direction, the second display state in which the certain image in the whole of the display regions is visible in one of the first viewing direction and the second viewing direction; and a control unit for controlling the transmission switching portion
(i) so that the first display state and the second display state are switched with each other when a state change is detected, and
(ii) so that, in the second display state, a first sub-state and a second sub-state are switched with each other using a time divisional multiplex method, the first sub-state in which a first image in the whole of the display regions is visible in the first viewing direction, the second sub-state in which a second image in the whole of the display regions is visible in the second viewing direction, and for controlling the display unit
so that the first image and the second image are alternately displayed in synchronization to switching the first sub-state and the second sub-state with each other using the time divisional multiplex method.

14. The display device of claim 13, wherein:

the display device is for a vehicle;

whether the vehicle stops or runs is detected by a stop state detector; and the control unit controls the transmission switching portion
so that the first display state appears when it is detected that the vehicle stops, and
so that the second display state appears when it is detected that the vehicle runs.

15. The display device of claim 13, wherein the transmission switching portion includes a plurality of segment units, and the transmission state of the portion of the unit region is switched with respect to each segment unit.

16. The display device of claim 13, wherein
the parallactic barrier includes a liquid crystal display.

17. The display device of claim 13, wherein
the parallactic barrier includes a mechanical shutter.

18. The display device of claim 13, wherein
the first viewing direction and the second viewing direction are included in a plurality of directions.

19. The display device of claim 13, wherein
the display device is for a vehicle, and
the first viewing direction is a direction in which a driver seat of the vehicle views the display unit, while the second viewing direction is a direction in which a front passenger seat of the vehicle views the display unit.

20. The display device of claim 13, wherein
the first display state is a state in which the certain image is visible in three directions of the first viewing direction, the second viewing direction, and a third viewing direction, which is disposed between the first viewing direction and the second viewing direction, and
the second display state is a state, in which the certain image is visible in two directions of (i) the third viewing direction and (ii) one of the first viewing direction and the second viewing direction.

21. The display device of claim 20, wherein
the display device is for a vehicle,
the first viewing direction is a direction in which a driver seat of the vehicle views the display unit,
the second viewing direction is a direction in which a front passenger seat of the vehicle views the display unit, and
the third viewing direction is a direction in which a rear seat of the vehicle views the display unit.

* * * * *